(12) United States Patent
Li

(10) Patent No.: US 6,575,000 B1
(45) Date of Patent: Jun. 10, 2003

(54) LOCK FOR A TRAILER (75) Inventor: Show-Mon Li, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 0 days.

(21) Appl. No.: 10/206,207

(22) Filed: Jul. 29, 2002

(51) Int. Cl.[7] .............................................. E05B 67/36
(52) U.S. Cl. .............................. 70/34; 70/258; 280/507
(58) Field of Search ............................... 70/14, 31, 32, 70/34, 58, 258, 386, DIG. 62; 280/507

(56) References Cited

U.S. PATENT DOCUMENTS 4,711,106 A * 12/1987 Johnson ......................... 70/34
6,055,832 A * 5/2000 Wyers ............................ 70/34
6,402,181 B1 * 6/2002 Lee ............................. 280/507
6,425,272 B1 * 7/2002 Chen ............................. 70/34

* cited by examiner

Primary Examiner—Lloyd A. Gall
(74) Attorney, Agent, or Firm—Rosenberg, Klein & Lee (57) ABSTRACT

An improved lock for a trailer enables a latch bolt to be inserted conveniently, and allows locking and unlocking operations be done easily. The lock mainly consists of a latch bar and a lock member. The lock member includes a latch sleeve, a lock ring, a connection shaft and a lock core. The lock may be easily locked or unlocked by turning a key for 90°.

3 Claims, 10 Drawing Sheets

PRIOR ART

FIG. 13

PRIOR ART

LOCK FOR A TRAILER

BACKGROUND OF THE INVENTION

1. Field of the Invention

The invention relates to an improved lock for a trailer and particularly a trailer lock that is easy for a latch bolt to insert and to perform locking or unlocking operations.

2. Description of the Prior Art

Figure 9:
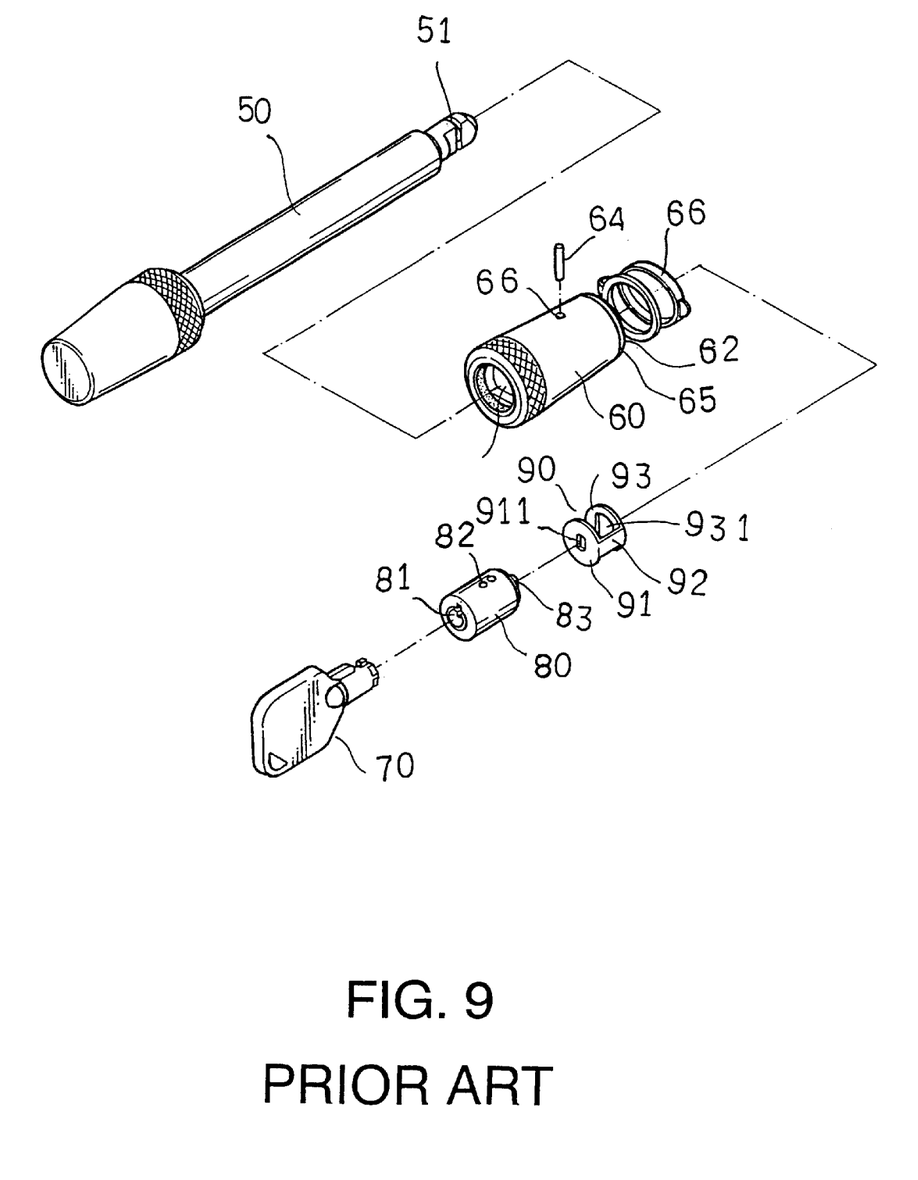
FIG. 9 is an exploded view of a conventional lock for trailers.
Figure 10:
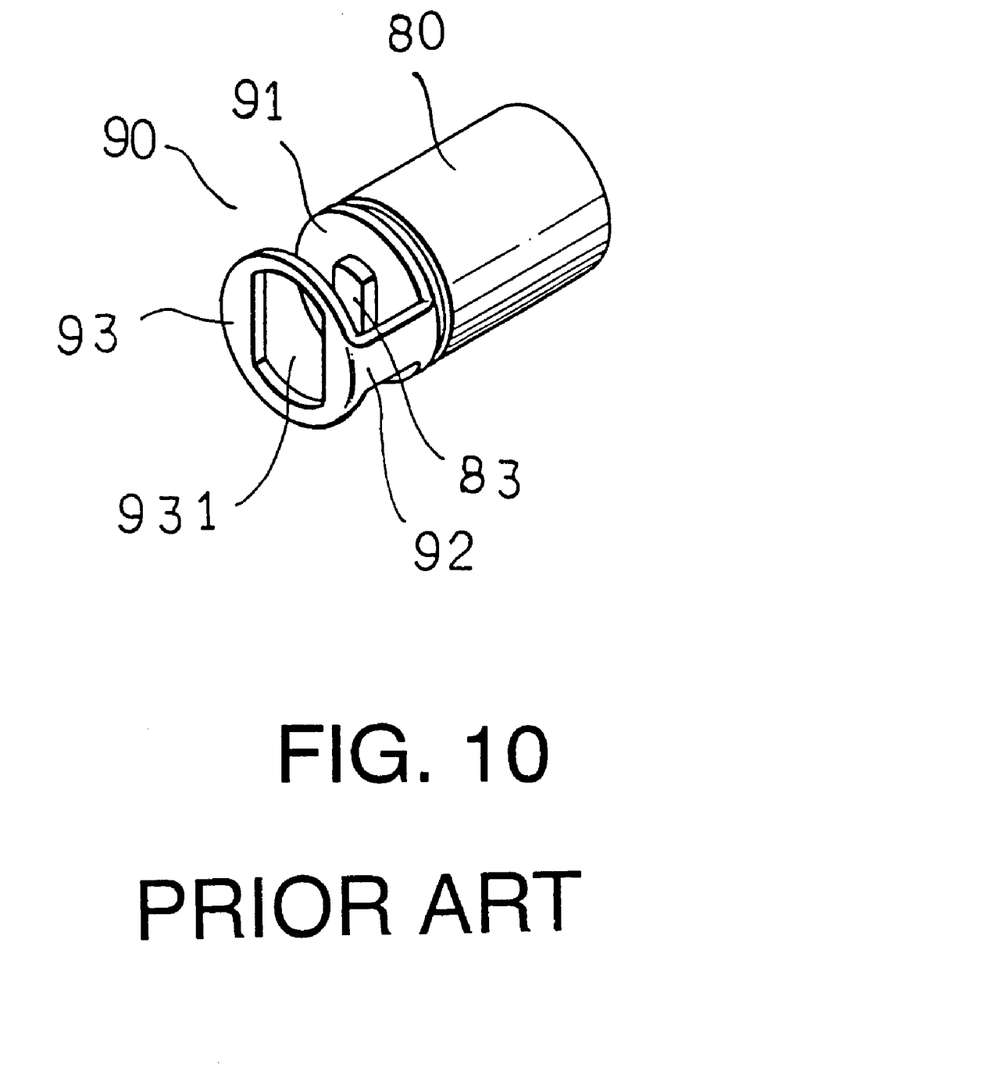
FIG. 10 is a perspective view of a latch member and a lock core of a conventional lock for trailers.
Figure 11:
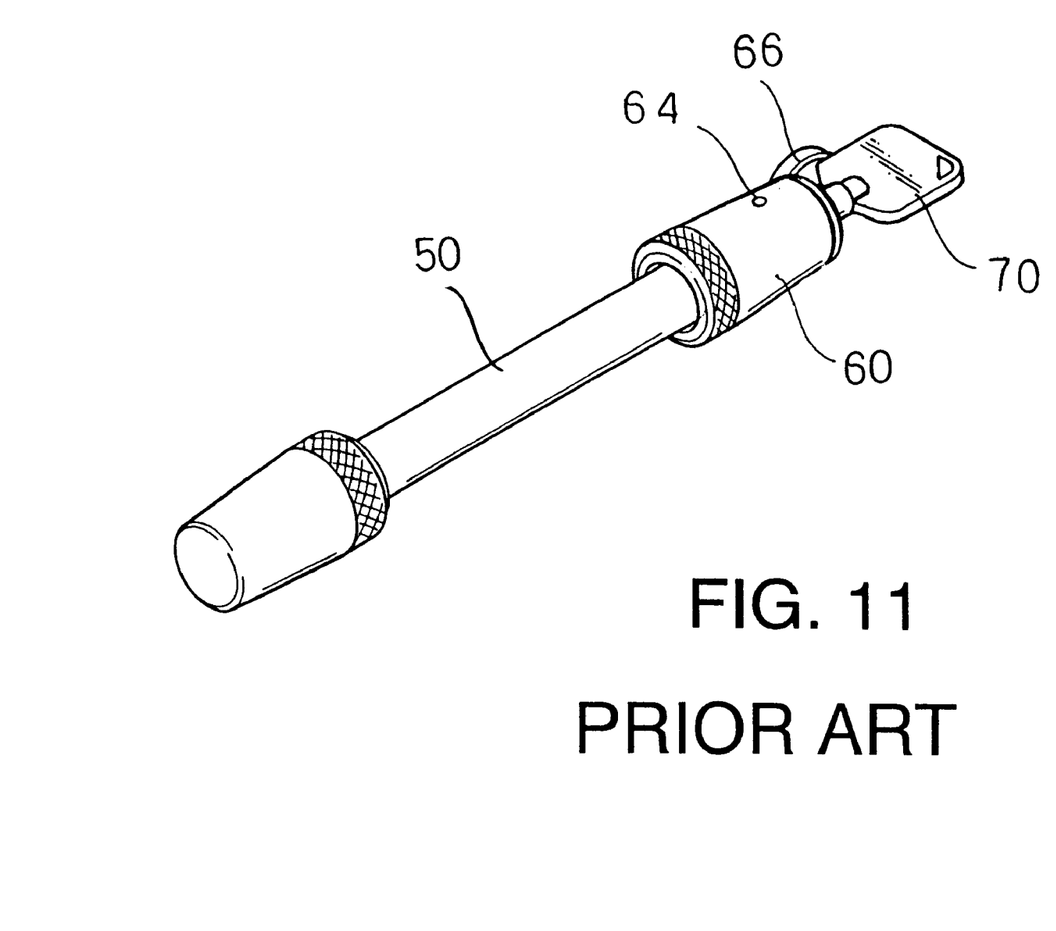
FIG. 11 is a perspective view of a conventional lock for trailers.

Travel and recreational activities have become increasingly popular these days. They not only benefit people's physical and mental health, also are good to business and economic developments. During travels, many people use trailers to haul various outfits, foods, drinking water, etc. The trailer is usually fastened to the rear end of a car, and is anchored by a latch bolt. In order to guard the trailer against theft, a latch bolt doubles as a lock has been developed. FIGS. 9 through 11 show such a latch bolt. It mainly includes a lock member 60 with an insert hole 61 formed at one end for receiving a latch end 51 of a shank 50. The lock member 60 has another end formed an opening 62 to engage sequentially a latch member 90 and a lock core 80. The another end further has a groove 65 to engage with a cap 66. The lock core 80 has a key way 81 formed at one end, a pin hole 82 formed on one side to match an aperture 66 formed on the lock member 60 to receive a pin 64 to anchor the lock core 80 in the lock member 60, and a lock tongue 83 located at another end thereof to couple with a latch member 90. The lock core 80 may be turned and controlled by a key 70. The latch member 90 is integrally formed and includes a base plate 91 with a retain hole 911 formed thereon to match and couple with the lock tongue 83, a connection section 92 extended on one side, and an upper plate 93 connected to the connection section 92. The upper plate 93 has a latch frame 931 formed thereon.

Figure 12:
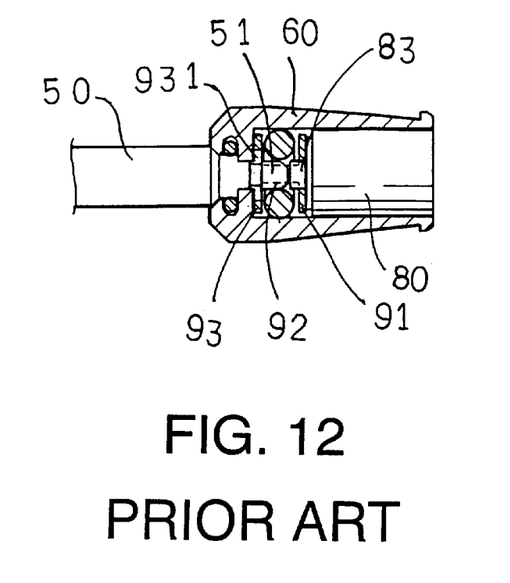
FIG. 12 is a sectional view of a conventional lock for trailers.
Figure 13:
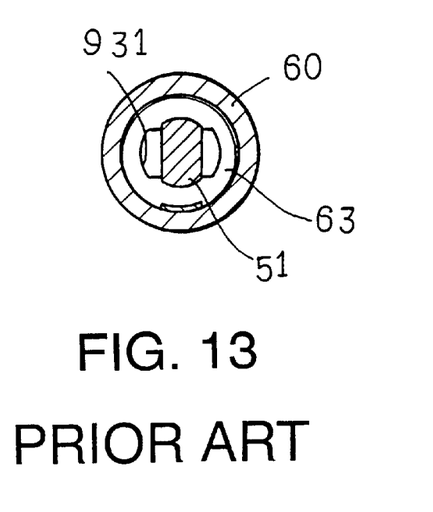
FIG. 13 is a cross section of a conventional lock for trailers in use.

When in use, the latch end 51 of the shank 50 is inserted into the latch member 90 through the insert hole 61 of the lock member 60. Then the key 70 is turned to turn the lock core 80 which turns the lock tongue 83 and drives the latch member 90 to turn. As a result, the direction of the latch frame 931 on the upper plate 93 changes. Then the latch frame 931 may latch the latch end 51 of the shank 50 to prevent the shank 50 from being pulled out of the lock member 60. This is a locked condition (as shown in FIGS. 12 and 13). On the other hand, the key 70 may be turned to drive the latch member 90 and change the direction of the latch frame 931 so that the shank 50 is not latched by latch frame 931. Then the shank 50 may be removed from the lock member 60 to form an unlocking condition. Insertion of the latch end is done at the opposite directions 180° apart. Such a design has the following disadvantages:

1. As the latch end 51 and the insert hole 61 are aligned at positions of 180° apart, there are only two inserting locations for the latch end of the shank 50. Operation is not convenient and is time-consuming.
2. The lock core has to be turned at a large angle of 180° when in use. It is against the prevailing trend of locking devices that mostly adopt the turning angle of 90°. Such a design has no competitiveness and incurs higher cost.

SUMMARY OF THE INVENTION

In view of aforesaid disadvantages, the primary object of the invention is to provide an improved lock for a trailer that is easy for the latch bolt to be inserted to perform locking or unlocking operations, and is turned at a smaller angle (about 90°) when in use.

To attain the foregoing object, the invention mainly includes a latch bar and a lock member. The latch bar includes a latch bolt to match the key way, lock ring, connection shaft and lock core of the lock. Locking operations can be done easily. Unlocking can be accomplished by turning the lock core for a small angle and can be done quickly and conveniently.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
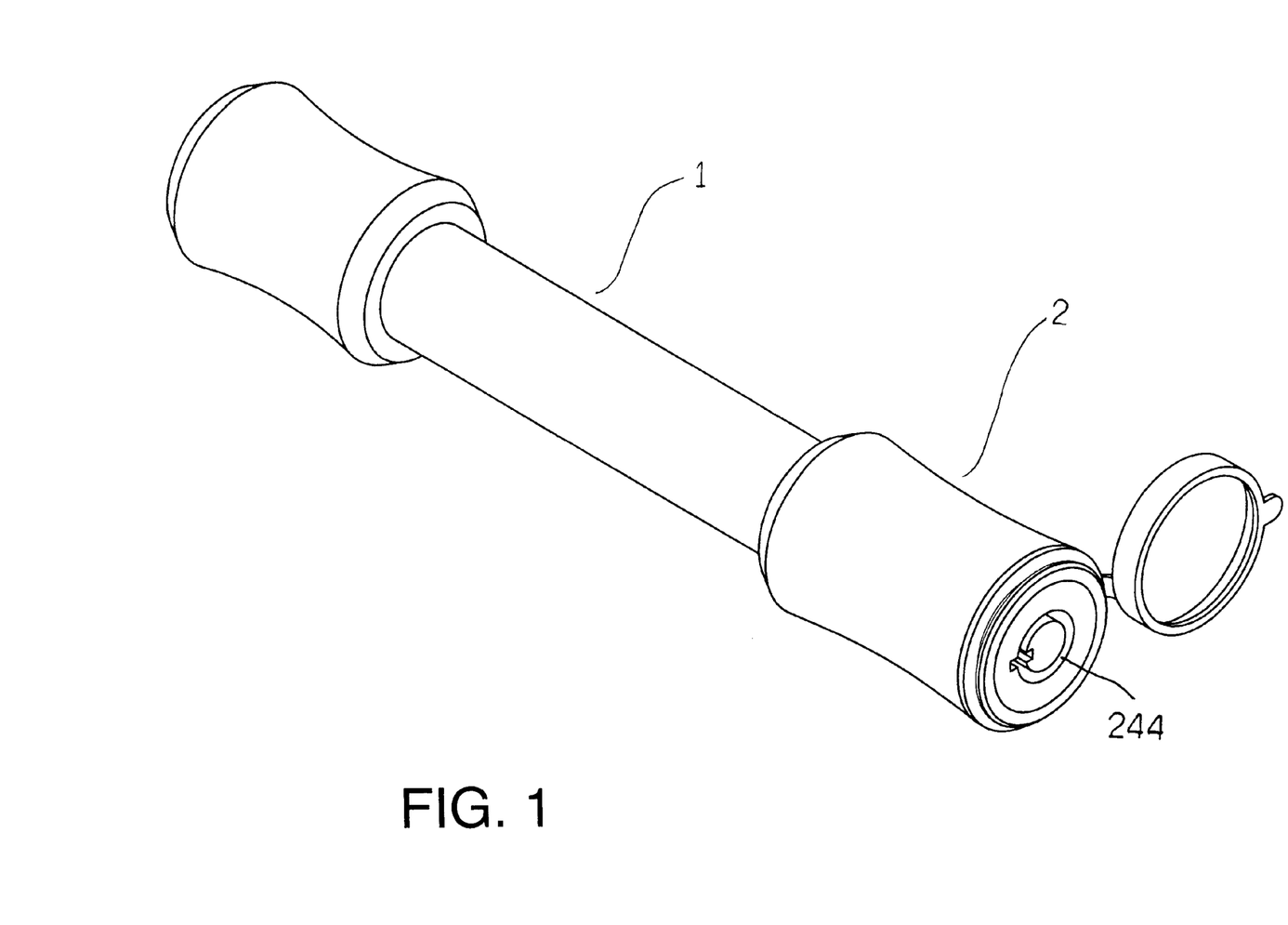
FIG. 1 is a perspective view of the invention.
Figure 2:
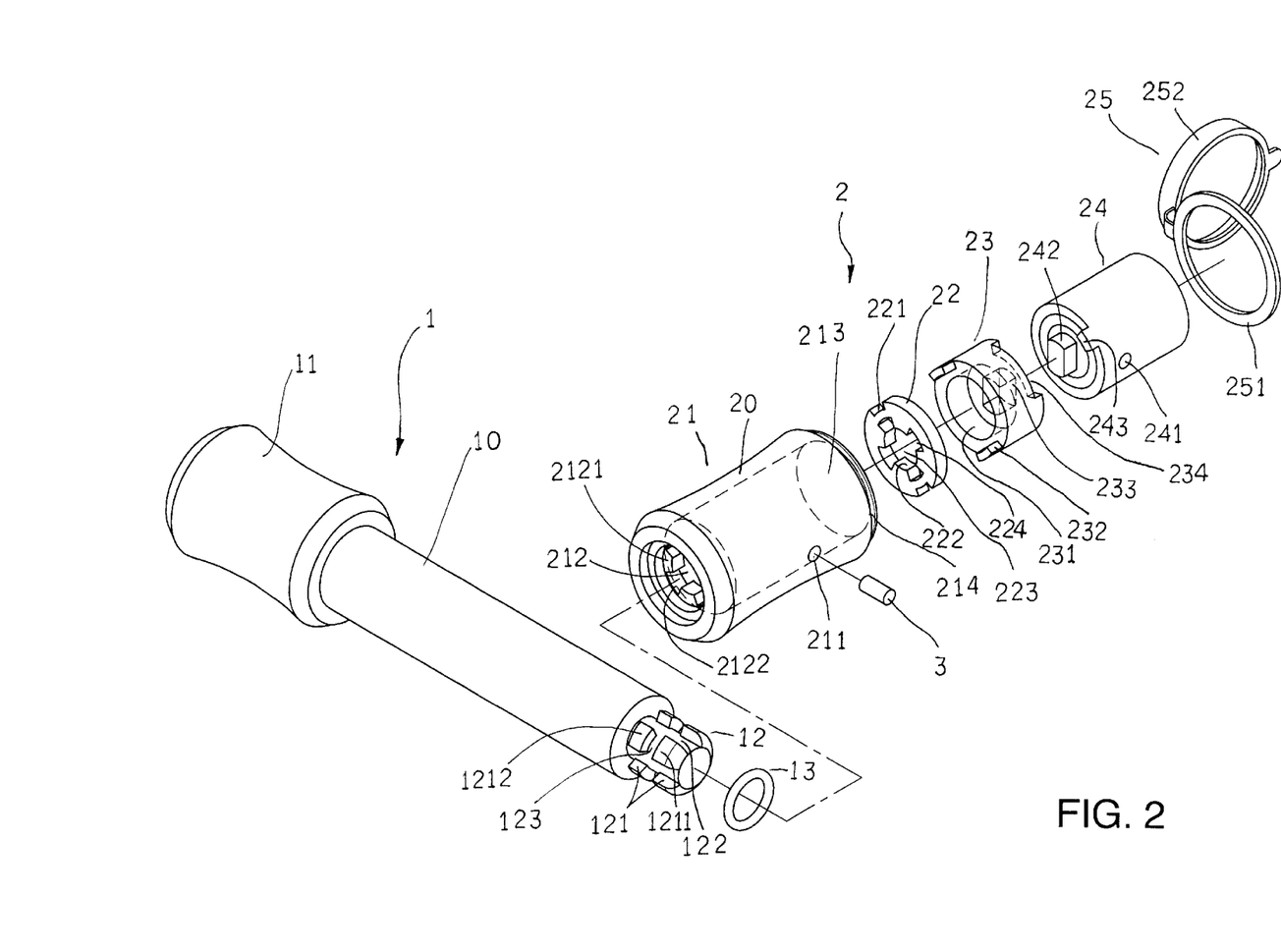
FIG. 2 is an exploded view of the invention.

Referring to FIGS. 1 and 2, the invention mainly includes a latch bar 1 and a lock member 2.

The latch bar 1 has a shank 10, an anchor end 11 of a larger size located at one end of the shank 10, and a latch bolt 12 located at another end of the shank 10. The latch bolt 12 is coupled with a waterproof washer 13. The latch bolt 12 has at least four symmetrical latch blocks 121 equally spaced from one another. Every two neighboring latch blocks 121 are divided by a longitudinal slot 122. Each latch block 121 is cut through by an annular slot 123 in the middle portion to form a front latch block 1211 and a rear latch block 1212.

The lock member 2 consists of:

a lock sleeve 21 which includes a hollow shell 20, an insert hole 212 formed at one end for receiving the latch bolt 12. The insert hole 212 has at least four symmetrical first notches 2122 formed on the peripheral rim equally spaced from one another. Every two neighboring first notches 2122 are bridged by a first lug 2121. The insert hole 212 matches and is engageable with the latch bolt 12 of the latch bar 1. The lock sleeve 21 has another end formed a round opening 213 and an annular groove 214 on the peripheral surface thereof.

Figure 6:
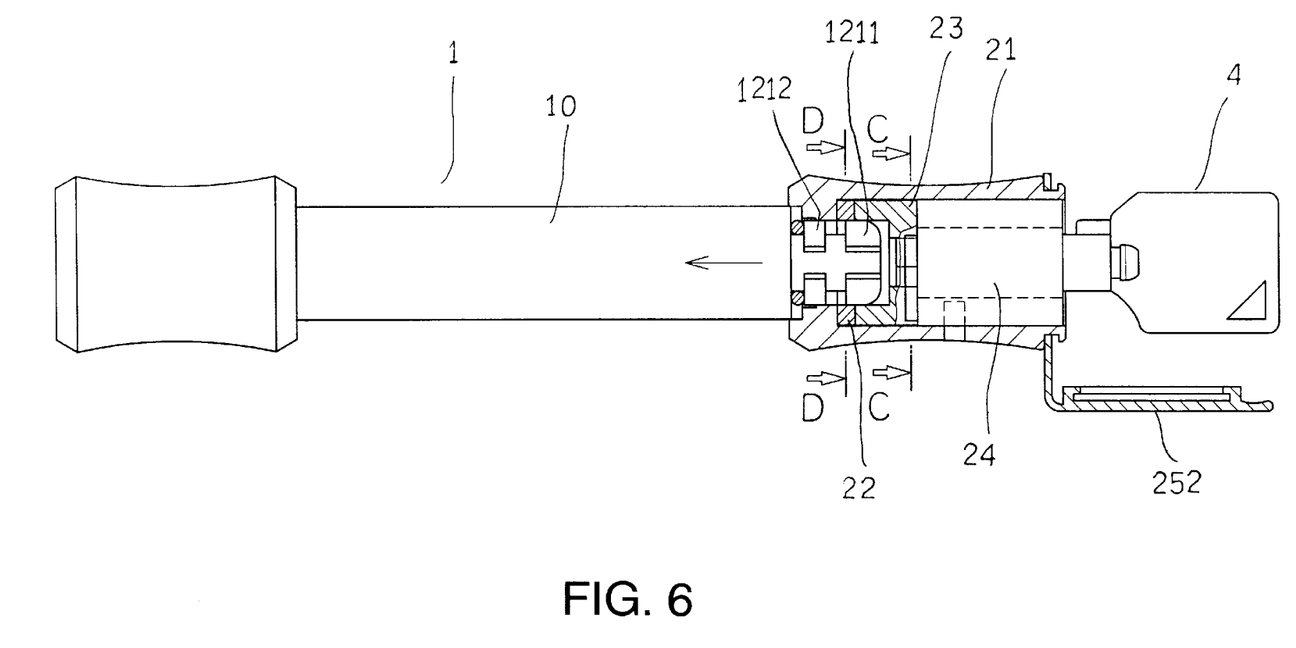
FIG. 6 is a sectional view of the invention in use, for unlocking.

The round opening 213 may contain sequentially a lock ring 22, a connection shaft 23 and a lock core 24. The lock sleeve 21 further has an anchor hole 211 formed in the middle portion for receiving a pin 3 to anchor the lock core 24;

a lock ring 22 which has two wedge slots 221 formed at two ends and an inner hole 223 formed in the center matching the insert hole 212 of the lock sleeve 21. The inner hole 223 has second notches 224 and second lugs 222 formed on the peripheral rim corresponding to the insert hole 212;

a connection shaft 23 which has a trough 231 formed at one end for housing the latch bolt 12. The top rim of the trough 231 has two stubs 232 corresponding to the wedge slots 221 of the lock ring 22. The connection shaft 23 has another end formed a wedge cavity 233 and an outer rim formed a retain groove 234;

a lock core 24 which is a standard element and has an aperture 241 located at a front section corresponding to the anchor hole 211 of the lock sleeve 21 to engage with the pin 3 to anchor the lock core 24 in the lock sleeve 21. The lock core 24 has a lock tongue 242 located at one end to engage with the wedge cavity 233 of the connection shaft 23, and a retain stub 243 located on the peripheral rim of one end. The retain stub 243 is movable within the retain groove 234 of the connection shaft 23. The lock core 24 has a key way 244 formed at another end to receive a key 4 (as shown in FIG. 6); and a dust guarding cap 25 which includes a coupling ring 251 for fastening to the annular groove 214 of the lock sleeve 21 and a movable lid 252 for covering the key way 244 to prevent rain water and dusts from entering into the key way 244.

Figure 3:
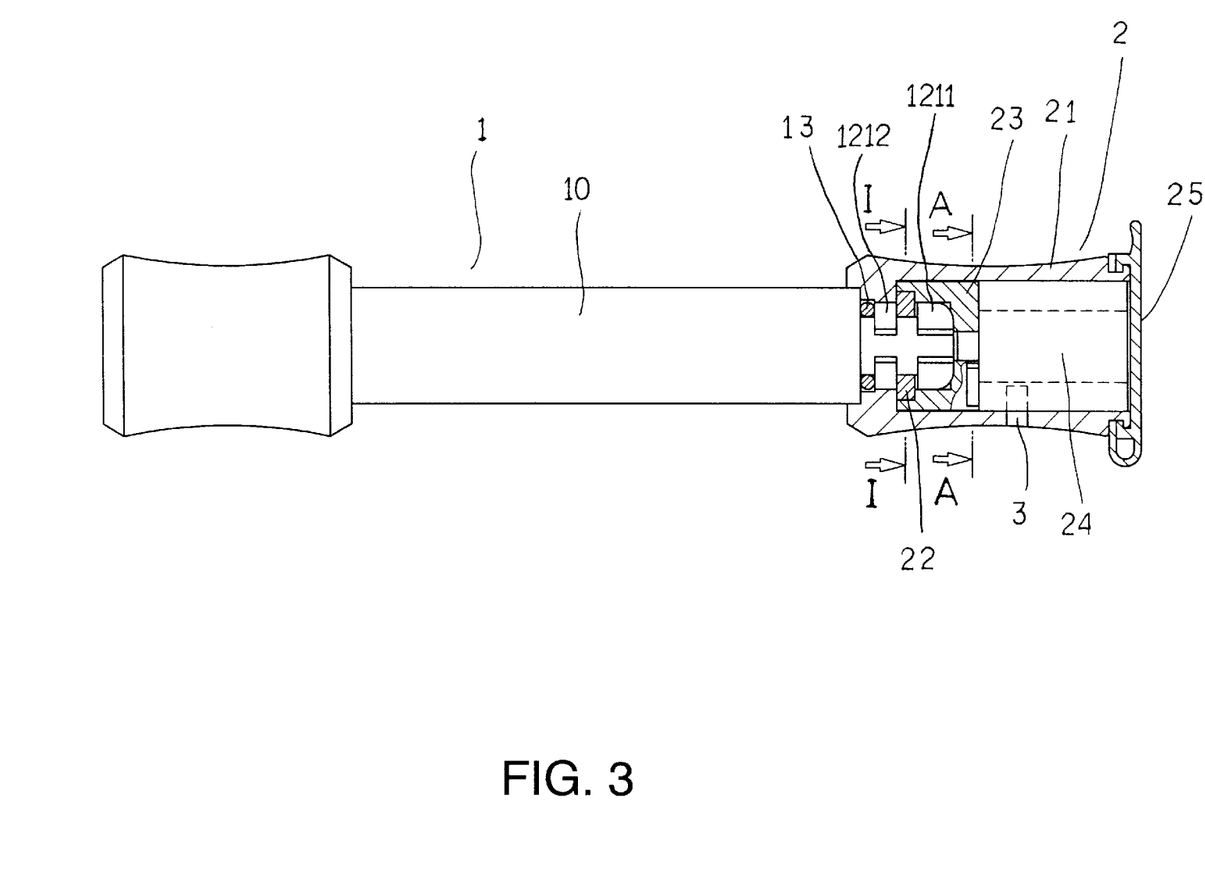
FIG. 3 is a sectional view of the invention, showing a locked condition
Figure 4:
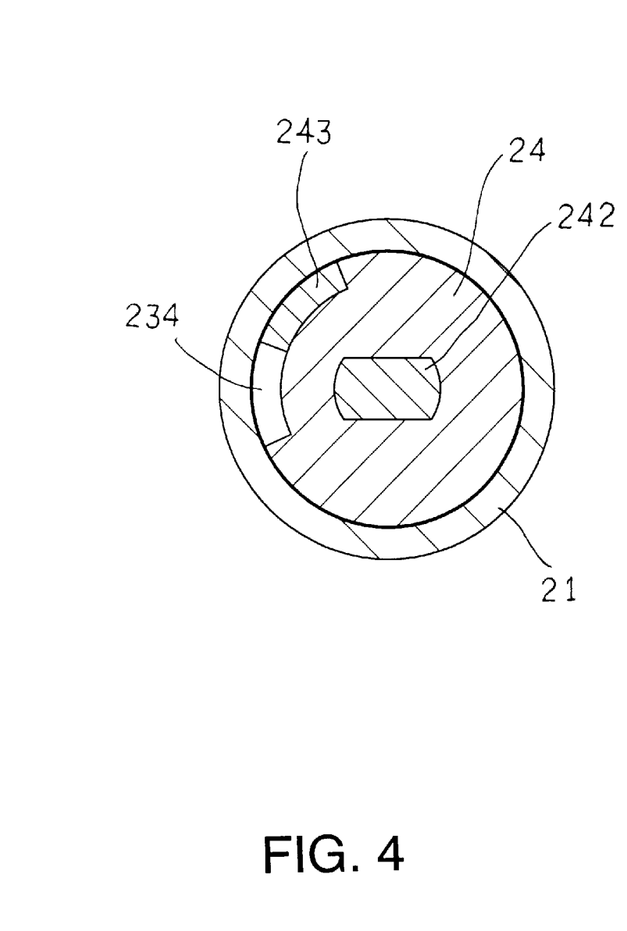
FIG. 4 is a cross section of a lock core taken along line A—A in FIG. 3.
Figure 5:
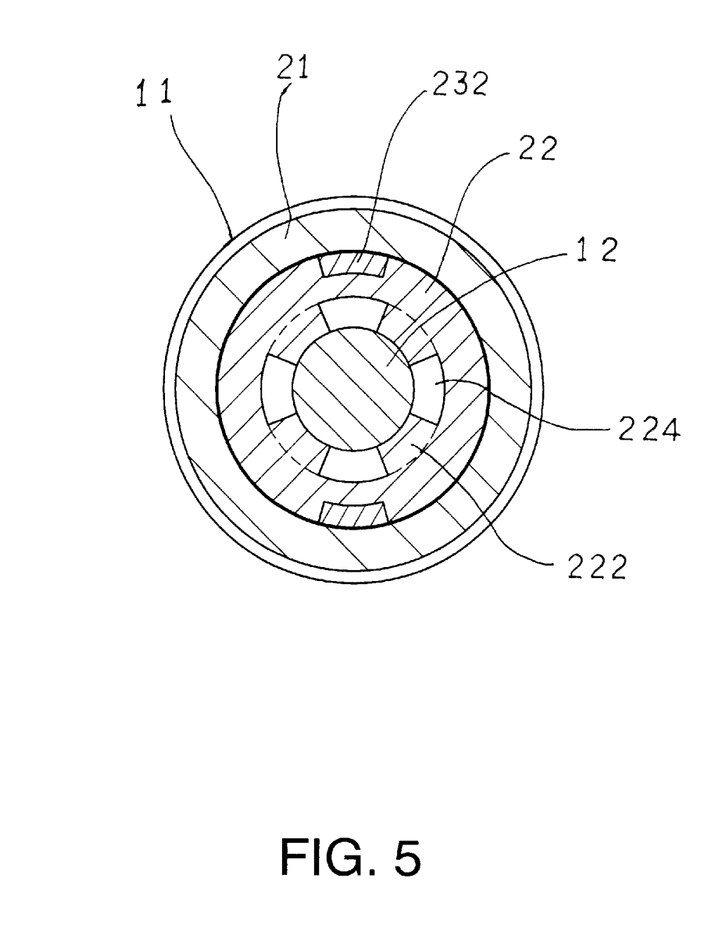
FIG. 5 is a cross section of a lock ring taken along line I—I in FIG. 3.
Figure 7:
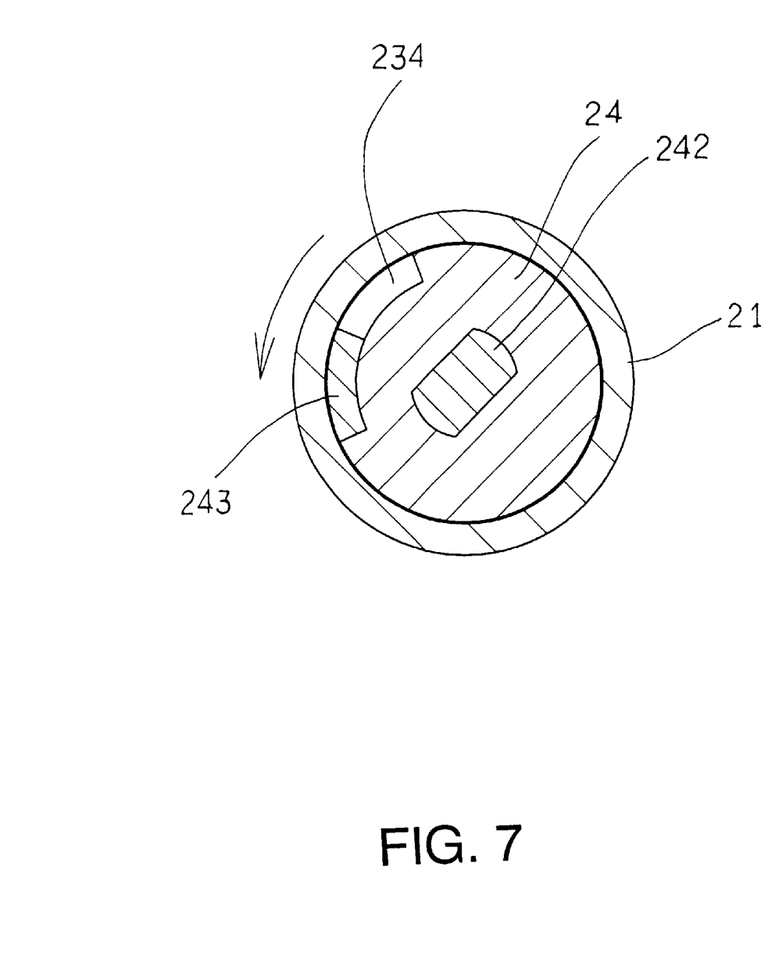
FIG. 7 is a cross section of a lock core taken along line C—C in FIG. 6.
Figure 8:
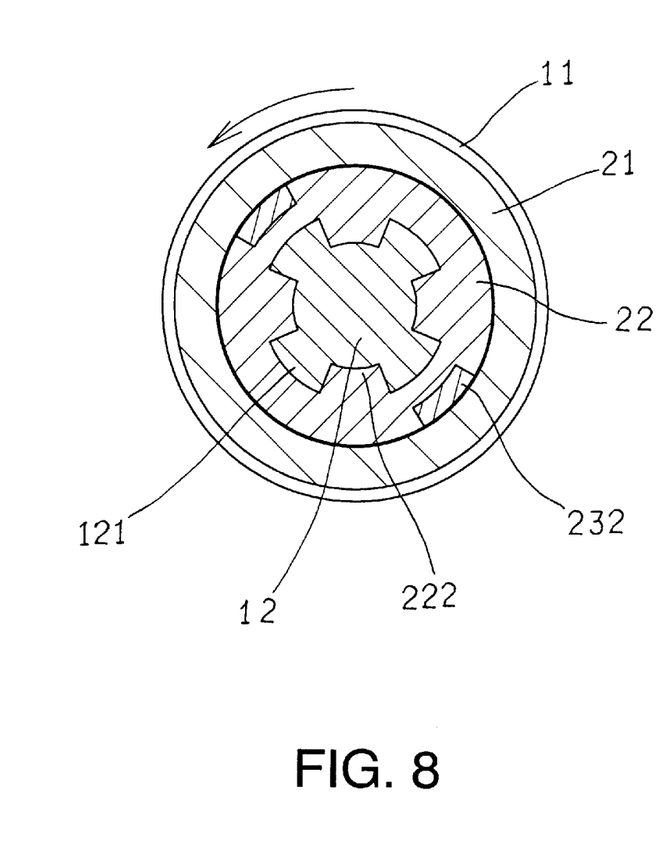
FIG. 8 is a cross section of a lock ring taken along line D—D in FIG. 6.

Referring to FIGS. 3, 4 and 5, when in use for locking, the latch bolt 12 of the latch bar 1 is inserted into the insert hole 212 of the lock member 2. As the second notches 224 are formed in a symmetrical fashion, the latch bolt 12 may be inserted into the insert hole 212 in a small angular range rapidly. Moreover, as the insert hole 212 has at least four aligned insert points on the peripheral rim, the key 4 may be turned for a small angle (about 90°) to make the lock tongue 242 of the lock core 24 to drive the connection shaft 23 and the lock ring 22. And the lock ring 22 may be moved in the annular slot 123 of the latch bolt 12 such that the inner hole 223 is moved in a staggered manner against the insert hole 212 of the lock sleeve 21 (as shown in FIGS. 4 and 5) to accomplish the locking function. On the other hand, for unlocking, turn the key 4 to drive the lock core 24 to move the lock tongue 242, consequently the connection shaft 23 and the lock ring 22 are turned to enable the inner hole 223 of the lock ring 22 and the insert hole 212 of the lock sleeve 21 to align with each other. Then the latch bar 1 may be removed freely from the lock member 2 to complete the unlocking operations (as shown in FIGS. 6, 7 and 8).

By means of the construction set forth above, the trailer lock of the invention enables the latch bolt to be inserted conveniently, and locking and unlocking operations can be done easily to effectively overcome the problems occurred to conventional trailer locks.

I claim:

1. An improved lock for a trailer comprising a latch bar and a lock member, wherein:

the latch bar has a shank, an anchor end of a larger size than the shank located at one end, and a latch bolt located at another end thereof, the latch bolt having at least four symmetrical latch blocks equally spaced from one another, every two neighboring latch blocks being divided by a longitudinal slot, each latch block being cut through by an annular slot in a middle portion thereof to form a front latch block and a rear latch block; and the lock member includes:

a lock sleeve being a hollow shell and having an insert hole formed at one end for receiving the latch bolt, the insert hole having at least four symmetrical first notches formed on the peripheral rim equally spaced from one another, every two neighboring first notches being bridged by a first lug, the insert hole matching and being engageable with the latch bolt of the latch bar, the lock sleeve having another end formed a round opening for housing sequentially a lock ring, a connection shaft and a lock core, the lock sleeve further having an anchor hole formed in a middle portion for receiving a pin to anchor the lock core;

a lock ring having two wedge slots formed at two ends thereof and an inner hole formed in the center thereof matching the insert hole of the lock sleeve, the inner hole having second notches and second lugs formed on the peripheral rim corresponding to the insert hole;

a connection shaft having a trough formed at one end for housing the latch bolt, the trough having two stubs formed on a top rim thereof corresponding to the wedge slots of the lock ring, the connection shaft further having another end formed a wedge cavity and an outer rim formed a retain groove; and a lock core being a standard element and having an aperture located at a front section corresponding to the anchor hole of the lock sleeve to engage with the pin to anchor the lock core in the lock sleeve, a lock tongue located at one end thereof and a retain stub located on the peripheral rim of the one end movable within the retain groove of the connection shaft, the lock core having a key way formed at another end to receive a key.

2. The improved lock for a trailer of claim 1, wherein the lock sleeve further has an annular groove formed on the peripheral surface of the another end to engage with a coupling ring of a dust guarding cap.

3. The improved lock for a trailer of claim 1, wherein the latch bar couples with a waterproof washer at the another end where the latch bolt is located.

* * * * *